United States Patent Office 2,985,679
Patented May 23, 1961

2,985,679

CHLOROCYANOALKYL SILANES AND SILOXANES

Enrico J. Pepe, Kenmore, N.Y., assignor to Union Carbide Corporation, a corporation of New York No Drawing. Filed Aug. 3, 1959, Ser. No. 831,047

11 Claims. (Cl. 260—448.8)

This invention relates in general to novel carbofunctional organosilicon compounds and to a process for their production. More particularly, this invention relates to carbofunctional organosilicon compounds containing an alkyl group having both cyano and chlorine substituents thereon and to a process for producing such compounds.

The carbofunctional organosilicon compounds of the instant invention are organosilicon compounds containing at least one silicon-bonded chloro-cyanoalkyl group of the formula:

$$NC(C_aH_bCl_c)- \quad (1)$$

wherein $(a)$ is an integer of from 2 to 12, $(b)$ is an integer, $(c)$ is an integer of at least 1, and the sum of $(b+c)$ is equal to $2a$ and the organosilicon compound is selected from the class consisting of (1) organosilanes having at least one valence of silicon, other than the valences satisfied by the chlorocyanoalkyl group, satisfied by a halogen atom or an alkoxy group, the remaining valences of silicon being satisfied by methyl groups or phenyl groups and (2) organosiloxanes having all of the valences of the silicon atom containing the chloro-cyanoalkyl group, other than the valences satisfied by said chloro-cyanoalkyl group and by siloxane linkages satisfied by methyl or phenyl groups and all remaining valences of silicon of said organosiloxane other than the silicon containing said chloro-cyanoalkyl group, satisfied by monovalent hydrocarbon groups. The compositions of this invention are hereinafter referred to as chloro-cyanoalkylsilicon compounds.

Thus, the chloro-cyanoalkylsilicon compounds of this invention include monomeric silanes and polymeric siloxanes.

The monomeric organosilanes of this invention are the chlorocyanoalkylsilanes represented by the formula:

$$(NC-C_aH_bCl_c)_x-\underset{\underset{R_m}{|}}{Si}-X_{4-(n+m)} \quad (2)$$

wherein $(a)$, $(b)$ and $(c)$ have the above-defined meanings, R is a methyl or a phenyl group, X is chlorine, fluorine or alkoxy groups, $(n)$ is an integer of from 1 to 3, $(m)$ is an integer of from 0 to 2 and the sum of $(n)$ and $(m)$ is from 1 to 3. Illustrative of the chlorocyanoalkylsilanes of the invention are 2-chloro-2-cyanoethyltrichlorosilane, 2,2-dichloro-2-cyanoethyltriethoxysilane, 2-chloro-2-cyanopropyltrifluorosilane, 3,3-dichloro-3-cyanopropyltrichlorosilane and the like; di(2-chloro-2-cyanoethyl)dichlorosilane, di(2,2-dichloro-2-cyanoethyl)-diethoxysilane, 3-chloro-3-cyanopropylmethyldichlorosilane, 3-chloro-3-cyanopropylmethyldifluorosilane and the like; tri(2-chloro-2-cyanoethyl)chlorosilane, 2-chloro-2-cyanopropyldimethylfluorosilane, 3-chloro-2-cyanopropyldiethylethoxysilane and the like. Examples of the alkoxy groups that are represented by X are methoxy, ethoxy, propoxy, butoxy, stearoxy and the like.

The polymeric siloxanes of this invention include those organosiloxanes containing units of formula:

$$(NC-C_aH_bCl_c)_x-\underset{\underset{R_m}{|}}{Si}-O_{\frac{4-(n+m)}{2}} \quad (3)$$

defined meanings. These polymeric siloxanes include the trifunctional siloxanes, difunctional siloxanes and monofunctional siloxanes. The monofunctional siloxanes of this invention are those having units of the above formula where the sum of $(n)$ and $(m)$ is three. These monofunctional siloxanes are, for example, bis-(2-chloro-2-cyanoethyl)tetramethyl disiloxane, tetra-(2-chloro-2-cyanoethyl)dimethyl disiloxane, hexa-(2-chloro-2-cyanopropyl) disiloxane and the like. The difunctional siloxanes of this invention are those having units of Formula 3 where the sum of $(n)$ and $(m)$ is two and includes linear siloxanes having a number of such units, for example, 2-chloro-2-cyanoethylmethylpolysiloxane, 3-chloro-3-cyanopropylphenylpolysiloxane, 3,3-dichloro-3-cyanopropylmethylpolysiloxane, 3-chloro-2-cyanopropylmethylpolysiloxane and the like. The difunctional siloxanes also include cyclic siloxanes having from 3 to 7 of such units, for example, tri-(2-chloro-2-cyanoethyl)trimethylcyclotrisiloxane, tetra-(3-chloro-3-cyanopropyl)tetraphenylcyclotetrasiloxane, tetra-(2,2-dichloro-2-cyanoethyl)tetramethylcyclotetrasiloxane, penta-(3-chloro-3-cyanopropyl)pentamethylcyclopentasiloxane and the like. The trifunctional siloxanes of this invention are those having units of Formula 3 when $(n)$ equals 1 and $(m)$ is zero and are, for example, 3-cyano-3-chloropropylpolysiloxane, 4-cyano-4-chlorobutylpolysiloxane, 3,3-dichloro-3-cyanopropylpolysiloxane and the like.

The polymeric siloxanes of this invention also include those having at least one unit of the Formula 3, and one or more siloxane units depicted by the formula:

$$R'_dSi-O_{\frac{4-d}{2}} \quad (4)$$

wherein R' is a monovalent hydrocarbon radical, $(d)$ is an integer of from 0 to 3 and $(d)$ need not have the same value throughout the same molecule, and R' can represent the same or different groups within the same molecule. Illustrative of the monovalent hydrocarbon radicals that R' can represent are alkyl groups such as methyl, ethyl, butyl and the like; alkenyl groups such as vinyl, allyl and the like; aryl groups such as phenyl, naphthyl and the like; aralkyl such as phenylethyl and the like; and alkaryl such as tolyl and the like. The polymeric organosiloxanes include end-blocked linear polymeric organosiloxane oils, cyclic organosiloxanes, and resinous organosiloxanes containing the same or different substituted mono-, di- and trifunctional silicon atoms.

In accordance with my invention, the new compounds thereof are prepared by the chlorination of cyanoalkyl-halosilanes of the formula:

$$(NC-C_aH_{2a})_x-\underset{\underset{R_m}{|}}{Si}-Y_{4-(n+m)}$$

where R, $(a)$, $(m)$ and $(n)$ are as above defined and Y is chlorine or fluorine, with gaseous chlorine in the presence of ultraviolet light and hydrogen chloride. The overall reaction can be depicted by the following equation which, for the purpose of illustration, depicts the chlorination of 3-cyanopropylmethyldichlorosilane:

(A)
$$NC-CH_2CH_2CH_2-Si(CH_3)Cl_2+Cl_2 \xrightarrow{HCl}_{U.V. light}$$

$$NC-\underset{\underset{Cl}{|}}{C}H-CH_2CH_2\underset{\underset{CH_3}{|}}{Si}-Cl_2+HCl$$

(B)
$$NC-\underset{\underset{Cl}{|}}{C}H-CH_2CH_2\underset{\underset{CH_3}{|}}{Si}-Cl_2+Cl_2 \xrightarrow{HCl}_{U.V. light}$$

$$NC-\underset{\underset{Cl}{|}}{C}-CH_2CH_2\underset{\underset{CH_3}{|}}{Si}\cdots$$

I have found that if the cyanoalkylchlorosilane is not treated with hydrogen chloride gas prior to the addition of the chlorine, no chlorination takes place. The temperature at which the cyanoalkylchlorosilane is treated with hydrogen chloride is not narrowly critical and can vary from as low as 0° C. to as high as 80° C. However, it is preferred to carry out the treatment with hydrogen chloride at a temperature from about 25° C. to about 40° C. so as to insure that the cyanoalkylchlorosilane will contain from about 1% to 10% by weight hydrogen chloride, at the temperature of chlorination. It is preferred that the cyanoalkylchlorosilane contain from 2 to 5% hydrogen chloride by weight. Although some of the cyanoalkylchlorosilanes are normally solid at room temperatures once melted they do not recrystallize rapidly and small amounts of impurities such as hydrogen chloride prevent the crystallization of the cyanoalkyl chlorosilanes at lower temperatures. Thus, for example, it is possible to melt 2-cyanoethyltrichlorosilane, charge it into a flask, cool the flask and contents to a temperature below the melting point and bubble dry hydrogen chloride into the liquid without recrystallization of the 2-cyanoethyltrichlorosilane.

The temperature at which the chlorination is accomplished is not narrowly critical and can be from about 0° C. to about 150° C. However, I prefer to conduct the chlorination at a temperature of from about 20° C. to about 80° C.

I have also found that unless the reaction is conducted in the presence of ultra violet light, the chlorination as depicted in Equations A and B does not take place. I have also found that diffuse sunlight is sufficient to initiate the chlorination.

The process of this invention may be conducted under widely varying conditions. Thus, the present process may be conducted as a vapor phase reaction or it may be conducted as a liquid phase reaction. It is preferred to conduct the reaction as a liquid phase reaction i.e. bubbling chlorine gas into the liquid cyanoalkylchlorosilane-hydrogen chloride solution.

The rate at which the chlorine gas is introduced into the solution is not narrowly critical; however, I prefer to control the rate of the introduction of the chlorine gas so that the temperature of the reaction does not exceed the preferred temperature of reaction given above and also to prevent excessive foaming.

As can be seen by Equation A, one mole of chlorine is required to react in order to introduce a chlorine radical into the cyanoalkylsilane. Furthermore, the introduction of a chlorine radical into the cyanoalkyl group of the cyanoalkylsilane renders the carbon atom containing said chlorine radical more readily susceptible to further chlorination. Thus if highest conversions of the cyanoalkylsilanes to chlorocyanoalkylsilanes are to be obtained at least 2 moles of chlorine should be employed for each equivalent cyanoalkyl group present (i.e. for monocyanoalkylsilanes at least 2 moles of chlorine per mole of the cyanoalkylsilane, for dicyanoalkylsilanes at least 4 moles of chlorine for each mole of the dicyanoalkylsilane, etc.). Of course greater or lesser amounts of chlorine may be employed but no commensurate advantages are obtained thereby.

The chlorocyanoalkylchlorosilanes of this invention can be esterified according to known procedures as, for example, by direct esterification with an alcohol, to yield the corresponding chlorocyanoalkylsilane esters. Thus, the chlorocyanoalkylchlorosilanes can be esterfied with aromatic alcohols such as phenol, benzyl alcohol and the like, and aliphatic alcohols such as methyl, ethyl, butyl, stearyl and the like. It is preferred to employ the aliphatic alcohols having from 1 to 4 carbon atoms for economic reasons. In the esterification reaction it is desired to minimize the formation of hydrogen chloride to keep the concentration at minimum to prevent undesirable side reactions such as the hydrolysis of the cyano group to a carboxy or a carbalkoxy group. Instead of employing an alcohol as the esterifying reagent, the formation of hydrogen chloride can be minimized by employing a trialkyl orthoformate as the esterifying reagent. The concentration of hydrogen chloride can also be kept at a minimum when an alcohol is employed as the esterifying agent through the use of a hydrogen chloride acceptor such as pyridine, quinoline, triethylamine, tri-n-butylamine and the like.

The chlorocyanoalkylsilanes of this invention can be hydrolyzed and condensed or the chlorocyanoalkylsilanes of this invention can be cohydrolyzed and cocondensed with alkoxy- or halosilanes of the formula $$R'_d SiX_{4-d} \quad (5)$$

where $R'$, $X$ and $d$ are as above defined to yield the polymeric siloxanes of this invention.

The hydrolysis and condensation or cohydrolysis and co-condensation of the chlorocyanoalkylsilanes of this invention can be accomplished by known methods such as, for example, adding a chlorocyanoalkylhalosilane to a mixture of diethyl ether and ice. It is necessary to keep the concentration of the liberated hydrogen chloride at a minimum in order to prevent undesirable side reactions such as hydrolysis of the cyano group to a carboxy group. If a chlorocyanoalkylalkoxysilane of this invention is employed in the hydrolysis it is preferred that the concentration of any acidic or basic catalyst employed be kept at a minimum to prevent side reactions.

The hydrolysis and condensation may be conducted according to the following general procedure:

The chlorocyanoalkylalkoxysilane is added slowly with rapid stirring to water which contains an acidic or basic catalyst. The siloxane thus formed is extracted with a non-water miscible liquid organic solvent and the solvent solution is washed with water until the water washings are neutral to litmus paper. The solvent is then removed by vacuum evaporation leaving as a residue the chlorocyanoalkylsiloxanes. The alkoxy or halosilanes of Formula 5 above also can be cohydrolyzed and co-condensed with the chlorocyanoalkylsilanes by the above procedure to yield siloxanes.

A solvent is not necessary during the hydrolysis described above; however, a solvent may be employed as desired. Suitable solvents are, for example, isopropyl ether, diethylether and the like; toluene, benzene and the like; and the diethers of ethylene glycol and polyethylene glycol and the like; and alcohols such as methanol ethanol and the like.

The temperature at which the hydrolysis is conducted is not narrowly critical and can be from 0° C. to 100 C.; however, temperatures of from about 0° C. to about 70° C. are preferred so as to give a reasonable rate of hydrolysis and to minimize side reactions.

Catalysts that are useful in the hydrolysis of the chlorocyanoalkylalkoxysilanes of this invention are the acids or bases. Suitable acid catalysts are, for example hydrochloric acid, sulfuric acid, oxalic acid, trifluoracet acid, acetic acid and the like. Suitable basic catalys are, for example, sodium hydroxide, potassium hydroxid ammonium hydroxide and the like. The concentratic of the catalyst is not narrowly critical and can be fro 0.001 N to about 2.0 N or even higher. The conce tration of the catalyst is preferably kept below 1.0 N order to prevent undesirable side reactions.

The cyanoalkylsilicon compounds that are useful starting materials is the preparation of the chlorocyar alkylsilicon compounds of this invention and the cyar alkylhalosilanes having the formula

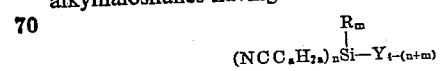

R, (a), (n) and (m) are as above defined and Y chlorine or fluorine. Such cyanoalkylchlorosilanes a for example, 2-cyanoethyltrichlorosilane, 2-cyanoeth trifluorosilane, 3-cyanopropylmethyldichlorosilane, 4-cyanobutyltrifluorosilane, 2-cyanopropylmethyltrifluorosilane, 4-cyanobutyldimethylchlorosilane, 11-cyanoundecyltrichlorosilane, di(2-cyanopropyl) dichlorosilane and the like. Such cyanoalkylchlorosilane are prepared by the reaction of an unsaturated nitrile with a silane containing a silicon bonded hydrogen atom in the presence of a catalyst such as platinum.

I have also found that high conversions of the cyanohalosilanes to chlorinated cyanoalkylhalosilanes can be obtained by an alternate process which comprises reacting chlorine with the 2-cyanoalkylhalosilane in the presence of ultra-violet light and ferric chloride at elevated temperatures.

The temperature at which the chlorination of the alternate process is conducted can vary from about 100° C. to about 145° C. It is preferred that the temperature of the reaction be maintained at from about 130° C. to about 140° C.

The amount of ferric chloride catalyst employed in the alternate process of this invention is not narrowly critical. It is preferred to employ from 0.5 to 2.0 parts ferric chloride per 100 parts of the 2-cyanopropylchlorosilane to be chlorinated.

The rate at which the chlorine is introduced into the 2-cyanopropylchlorosilane is not critical; however, I prefer to control the rate of the introduction of the chlorine gas so that the temperature of the reaction remains at from 120° C. to about 145° C.

In the isolation of the chlorocyanoalkylsilicon compounds of this invention, particularly the chlorocyanoalkylchlorosilanes it is desirable to distill the reaction products at reduced pressures in order to reduce undesirable side reactions such as cleavage of the C-Si bond, dehydrohalogenation and dechlorination. The reduced pressure isolation is particularly useful in the isolation of chlorocyanoethylchlorosilanes since the chlorocyanoethylchlorosilanes undergo spontaneous dehydrohalogenation if heated to from about 120° C. to 250° C. at atmospheric pressure.

The chlorocyanoalkylsiloxanes of this invention are useful as lubricants for steel on steel either alone or in a mixture with other siloxanes. The chlorocyanoalkylsilanes can be hydrolyzed to chlorocyanoalkylsiloxanes which are useful as protective and decorative coatings. The difunctional chlorocyanoalkylsiloxanes can be compounded with a silica filler and benzoyl peroxide and cured to tough, stretchy elastomers.

*Example 1*

Into a 500 ml., 3-necked flask fitted with thermometer, water condenser and fritted-glass, gas inlet tube were placed 2-cyanopropyltrichlorosilane $$CH_3—CH(CN)—CH_2—SiCl_3$$

(235 g., 1.16 moles), and $FeCl_3$ (4.7 g., 2 wt.-percent). The mixture was heated to 100° C., and ultraviolet rays from an ultraviolet lamp directed on the mixture. Chlorine gas was bubbled into the mixture at such a rate as to maintain the reaction temperature between 130–140° C. for approximately 3 hours. The mixture was freed of dissolved $Cl_2$ and HCl by sparging with dry nitrogen gas. The sparged mixture distilled at reduced pressure to yield 75 mole-percent of 2-chloro-2-cyanopropyltrichlorosilane, 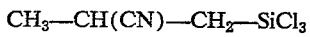, B.P. 88–91°/2.0 mm. $n^{25}$ 1.4682.

Calc. for $C_4H_5SiNCl_4$: 20.3% C; 2.1% H; 11.8% Si; 5.9% N; 59.8% Cl. Found: 21.4% C; 2.3% H; 12.5% Si; 6.8% N; 59.2% Cl.

The structure of the 2-chloro-2-cyanopropyltrichlorosilane was verified by infrared analysis. Other chlorined derivatives of 2-cyanopropyltrichlorosilane were isolated in an impure state.

*Example 2*

A 3-liter, three-necked Pyrex flask was equipped with a fritted glass gas diffuser, low temperature condenser cooled with solid carbon dioxide and a thermometer. 2-cyanoethyltrichlorosilane (2570 gm., 13.6 moles) was charged into the flask and treated with dry hydrogen chloride gas at room temperature and atmospheric pressure. An ultra-violet light source was directed on the contents of the flask. Chlorine gas was bubbled in the mixture for 6 hours at such a rate as to maintain the reaction temperature between 70–80° C. At the end of this period nitrogen was bubbled through the mixture for 1 hour to remove dissolved hydrogen chloride and chlorine. A weight increase of 459 g. was observed (equivalent to 13.3 moles of Cl). Said increase in weight being due to the reaction of the chlorine with the 2-cyanoethyltrichlorosilane.

The reaction material subjected to fractional distillation under reduced pressure gave the compound 2-cyano-2-chloroethyltrichlorosilane ($NC—CHCl—CH_2SiCl_3$) in approximately 5 wt.-percent yield; B.P. 98°/13 mm. Hg.

Calc. for $C_3H_3SiCl_4N$: 63.6% hydrolyzable chlorine. Found: 63.1% hydrolyzable chlorine.

*Example 3*

Into a 1-liter, 3-necked flask fitted with gas delivery tube, condenser, and thermometer was placed 3-cyanopropylmethyldichlorosilane $$(NC—(CH_2)_3Si(CH_3)Cl_2)$$

(500 g., 2.75 moles). The chlorosilane was cooled to +5° C. with an ice bath and HCl gas bubbled in until the chlorosilane appeared saturated (15 min.). Ultraviolet light was directed on the contents of the flask and chlorine gas was bubbled into the reaction mixture at moderate rate (about 1 g./minute) for 2.5 hr. The temperature rose to 50° C. in 2 hours. The reaction mixture was purged with nitrogen to remove dissolved gases and weighed. A gain in weight of 72 g. was observed with the weight gain being due to the amount of chlorine reacted. The reaction mixture (570 g.) was charged to a 1-liter distillation flask and distilled through a Vigreaux column at reduced pressure; two fractions were obtained, the first, 413.0 g., B.P. 85–95°/1.2 mm. Hg; $n^{25}$ 1.4728–1.4800; percent hydrolyzable Cl, 32.0–32.8; the second, 85 g., B.P. 95°/1.2 to 89/0.4 mm. Hg; $n^{25}$ 1.4812–1.4901; percent hydrolyzable Cl, 26.3. Infrared survey and the determination of hydrolyzable chlorine indicated fraction 1 to be predominantly 3-chloro-3-cyanopropylmethyldichlorosilane $$(NC—CHCl—(CH_2)_2Si(CH_3)Cl_2)$$

and fraction 2 to be predominantly 3,3-dichloro-3-cyanopropylmethyldichlorosilane $$(NC—CCl_2—(CH_2)_2Si(CH_3)Cl_2)$$

Both fractions were contaminated with the starting material. Redistillation of fraction 1 yielded 3-chloro-3-cyanopropylmethyldichlorosilane, $$NC—CHCl—(CH_2)_2Si(CH_3)Cl_2$$

B.P. 104°/4.0 mm. Hg, $n^{25}$ 1.4788; percent hydrolyzable Cl, 32.7 (theory, 32.7).

*Example 4*

In a 1-liter, 3-necked flask fitted with thermometer, stirrer, and dropping funnel was placed 2-chloro-2-cyanopropyltrichlorosilane, $CH_3CCl(CN)CH_2SiCl_3$ (129 g., 0.54 mole). Triethylorthoformate (240 g., 1.62 moles) was added over 0.5 hr. at room temperature (about 25° C.) with rapid stirring. The mixture was stirred an additional one hour then heated to 80° C. for one hour. Low boiling materials (ethylchloride, ethanol, ethylformate, etc.) were removed by vacuum stripping. The product 2-cyano-2-chloropropyltriethoxysilane, $$CH_3—CCl(CN)CH_2Si(OC_2H_5)_3$$

was obtained in 90 mole-percent yield by distillation at reduced pressure (B.P. 53° C./0.03 mm. Hg; $n^{25}$ 1.4200; $d^{25}$ 1.04 g./cc.).

Calc. for $C_{10}H_{20}SiO_3NCl$: 45.2% C; 7.6% H; 10.6% Si; 5.3% N; 51.0% $OC_2H_5$. Found: 47.6% C; 7.9% H; 11.4% Si; 4.8% N; 51.0% $OC_2H_5$.

The structure was verified by infrared analysis.

Example 5

Into a 500 ml. flask, fitted with a gas inlet tube, a gas outlet tube and a thermometer, was charged liquid 2-cyanoethyltrichlorosilane (205 g., 1.09 mole). Anhydrous hydrogen chloride was bubbled into the liquid 2-cyanoethyltrichlorosilane for 10 minutes at room temperature.

Chlorine gas was then bubbled into the 2-cyanoethyltrichlorosilane-hydrogen chloride mixture for 2 hours while the temperature was maintained at 55° C. The reaction was then discontinued and nitrogen bubbled through the reaction mixture to remove dissolved hydrogen chloride and unreacted chlorine. The reaction mixture was then distilled at reduced pressure (less than 5 mm. Hg) to yield unreacted starting material and a fraction (B.P. 84–6° C. at 0.9 mm. Hg) identified as being a mixture of polychlorinated derivatives of 2-cyanoethyltrichlorosilane. Heating of the reaction mixture to about 185° C. resulted in dechlorination and dehydrochlorination of the chlorinated derivatives to yield 2-chloro-2-cyanovinyltrichlorosilane (B.P. 181° C., $n^{25}$ 1.4897).

Example 6

The products obtained by the chlorination of 3-cyanopropylmethyldichlorosilane, $NC-(CH_2)_3SiCH_3Cl_2$, prepared as in Example 3 (497 g.) were charged into a 3-liter, 3-necked flask fitted with stirrer, dropping funnel, thermometer, and condenser. Triethylorthoformate (697 g., 4.7 moles) was added at room temperature over 1.5 hr. with vigorous stirring. The mixture was heated to 80° C. for 1 hr. The low boiling materials formed in the esterification such as ethylchloride, ethylformate and the like were removed at reduced pressure. The residue was distilled at atmospheric pressure to yield fraction 1 (226 g.), B.P. 84–98°/4 mm. Hg, $n^{25}$ 1.4271.

Infra-red and elemental analysis indicate that fraction 1 is a mixture of 3-cyanopropylmethyldiethoxysilane

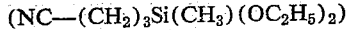
$(NC-(CH_2)_3Si(CH_3)(OC_2H_5)_2)$ and 3-chloro-3-cyanopropylmethyldiethoxysilane,

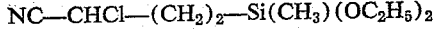
$NC-CHCl-(CH_2)_2-Si(CH_3)(OC_2H_5)_2$

Further distillation yields a second higher boiling fraction (fraction 2).

Infra-red analysis indicated that fraction 2 is a mixture of 3-chloro-3-cyanopropylmethyldiethoxysilane,

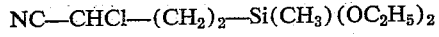
$NC-CHCl-(CH_2)_2-Si(CH_3)(OC_2H_5)_2$ and 3,3-dichloro-3-cyanopropylmethyldiethoxysilane,

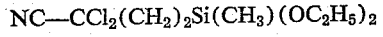
$NC-CCl_2(CH_2)_2Si(CH_3)(OC_2H_5)_2$

Example 7

Into a one-liter, three-necked flask fitted with mechanical stirrer, thermometer, condenser, and dropping funnel was placed 224 g. (1.0 mole) of 2,2-dichloro-2-cyanoethyltrichlorosilane,

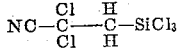
$$\begin{array}{c} Cl \ \ H \\ NC-C-C-SiCl_3 \\ Cl \ \ H \end{array}$$

The system was evacuated to about 90 mm. of Hg pressure. Ethanol, 138 g. (3.0 moles), was added dropwise with vigorous stirring over 30 minutes, maintaining the temperature below +5° C. by means of a solid carbon dioxide-acetone bath. The mixture was then stirred for 2 hours while warming to 25° C. and finally to 80° C. over 20 minutes with pressure reaching 90 mm. The mixture was charged to a 1-liter distillation flask and flash distilled to yield 167 g. of a product, B.P. 75°/1.0 mm. Hg, 68°/0.5 mm. Hg, $n^{25}$ 1.4293.

Fractional distillation of the product gave pure 2,2-dichloro-2-cyanoethyltriethoxysilane,

$NC-CCl_2-CH_2-Si(OC_2H_5)_3$ (B.P. 57°/0.16 mm. Hg, $n^{25}$ 1.4303).

Calc. for $C_9H_{17}SiO_3Cl_2N$: 37.7% C; 6.0% H; 24.7% Cl; 4.9% N; 9.8% Si. Found: 38.4% C; 6.1% H; 24.4% Cl; 4.1% N; 9.9% Si.

The structure of 2,2-dichloro-2-cyanoethyltriethoxysilane was verified by infrared analysis.

Example 8

Into a 2-liter, three-necked flask fitted with mechanical stirrer, thermometer, dropping funnel and condenser connected to a water aspirator was placed 521 g. (2.36 moles) of 2,2-dichloro-2-cyanoethyltrichlorosilane,

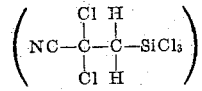
$$\left(\begin{array}{c} Cl \ \ H \\ NC-C-C-SiCl_3 \\ Cl \ \ H \end{array}\right)$$

The system was evacuated to approximately 90 mm. of Hg pressure and triethylorthoformate, 1100 g. (7.32 moles), was added dropwise at room temperature with vigorous stirring over 1 hour. The mixture was heated to 75° C. for 1 hour. The low boiling by-products of the reaction were removed by vacuum stripping. The reaction residue was distilled at reduced pressure to yield 2,2-dichloro-2-cyanoethyltriethoxysilane (B.P. 85° C./1.5 mm. Hg; $n_D^{25}$ 1.4294).

The structure of 2,2-dichloro-2-cyanoethyltriethoxysilane was verified by infra-red analysis.

Example 9

2-cyanoethyltrichlorosilane (205 g., 1.09 mol.) and ferric chloride (2 g.) were charged into a 500 ml. flask fitted with a gas inlet tube, thermometer and gas outlet tube. Anhydrous hydrogen chloride was bubbled into the contents of the flask for 10 minutes at approximately 25° C. A weight gain of 3.6 grams, due to dissolved hydrogen chloride, was observed and a clear yellow solution was obtained. Chlorine gas was then bubbled into the solution for a total of two hours in the presence of diffuse sunlight. The temperature of the reaction was from 35° C. to 55° C. During the chlorine addition the solution became red. When the solution turned red the chlorine addition was discontinued and the solution treated with anhydrous hydrogen chloride until the solution turned yellow. After the chlorine addition was completed (2 hours total addition) the solution was distilled under reduced pressure to yield 223 grams of a mixture of polychloro-2-cyanoethyltrichlorosilanes said mixture collected as a distillate boiling in the range of 43° C. at 0.25 mm. Hg to 86° C. at 0.9 mm. Hg, $n_d^{25}=1.4730$ and 55.5% hydrolyzable chlorine.

What is claimed:

1. As a new composition of matter an organosilicon compound containing at least one silicon-bonded chlorocyanoalkyl group of the formula

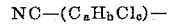
$NC-(C_aH_bCl_c)-$ wherein (a) is an integer of from 2 to 12, (b) is an integer, (c) is an integer, the sum of $b+c$ being equal to $2a$ and the organosilicon compound is selected from the class consisting of (1) organosilanes having at least one valence of silicon satisfied by a group selected from the class consisting of alkoxy groups and chlorine, the remaining valence of silicon being satisfied by a member of the class consisting of methyl groups and phenyl groups, and (2) organosiloxanes having all of the valences of the silicon atom containing the chlorocyanoalkyl group, other than the valences satisfied by said chlorocyanoalkyl group and by siloxane linkages, satisfied by a member of the class consisting of methyl groups and phenyl groups and all remaining valences of silicon of said organosiloxane being satisfied by monovalent hydrocarbon groups.

2. As a new composition of matter chlorocyanoalkylsilanes of the formula $$\text{NC}(C_aH_bCl_c)_n\underset{|}{\overset{R_m}{Si}}X_{4-m-n}$$

wherein R is a member of the class consisting of methyl groups and phenyl groups, X is selected from the class consisting of chlorine, fluorine and alkoxy groups, (a) is an integer of from 2 to 12, (b) is an integer, (c) is an integer, the sum of (b+c) being equal to 2a, (n) is an integer from 1 to 3, (m) is an integer of from 1 to 3 and the sum of (m+n) is from 1 to 3.

3. As a new composition of matter a chlorocyanoalkylsiloxane containing at least one unit of the formula $$\text{NC}(C_aH_bCl_c)_n\underset{|}{\overset{R_m}{Si}}O_{\frac{3-m-n}{2}}$$

wherein R is a member of the class consisting of methyl groups and phenyl groups, (a) is an integer of from 2 to 12, (b) is an integer, (c) is an integer, the sum of (b+c) being equal to 2a, (n) is an integer of from 1 to 3, (m) is an integer of from 1 to 3 and the sum of (m+n) is from 1 to 3.

4. As a new composition of matter, a chlorocyanoalkylsiloxane containing at least one unit of the formula $$\text{NC}(C_aH_bCl_c)_n\underset{|}{\overset{R_m}{Si}}O_{\frac{3-m-n}{2}}$$

wherein R is a member of the class consisting of methyl groups and phenyl groups, (a) is an integer of from 2 to 12, (b) is an integer, (c) is an integer, the sum of (b+c) being equal to 2a, (n) is an integer of from 1 to 3, (m) is an integer of from 1 to 3, and the sum of (m+n) is from 1 to 3, and at least one unit of the formula $$R'_dSiO_{\frac{4-d}{2}}$$

wherein R' is a monovalent hydrocarbon radical and (d) is an integer of from 0 to 3.

5. 2-chloro-2-cyanopropyltrichlorosilane.
6. 2-chloro-2-cyanopropyltriethoxysilane.
7. 2-chloro-2-cyanoethyltrichlorosilane.
8. 3-chloro-3-cyanopropylmethyldichlorosilane.
9. 2,2-dichloro-2-cyanoethyltriethoxysilane.
10. A process for the production of chlorocyanoalkylsilanes of the formula $$\text{NC}(C_aH_bCl_c)_n\underset{|}{\overset{R_m}{Si}}Y_{4-(m+n)}$$

wherein R is a member of the class consisting of methyl groups and phenyl groups, Y is selected from the group consisting of chlorine and fluorine, (a) is an integer of from 2 to 12, (b) is an integer, (c) is an integer of at least 1 the sum of (b+c) being equal to 2a, (n) is an integer of from 1 to 3, (m) is an integer of from 1 to 3 and the sum of (m+n) is from 1 to 3, which comprises reacting a cyanoalkylchlorosilane of the formula $$\text{NC}(C_aH_{2a})_n\underset{|}{\overset{R_m}{Si}}Y_{4-(m+n)}$$

wherein R, Y, (a), (m) and (n) are as above defined, with chlorine in the presence of ultraviolet light and anhydrous hydrogen chloride.

11. A process as claimed in claim 10 wherein the reaction is conducted in the presence of ultraviolet light, anhydrous hydrogen chloride and ferric chloride.

References Cited in the file of this patent
UNITED STATES PATENTS 2,907,784    Jex et al. _____ Oct. 6, 1959

FOREIGN PATENTS 1,116,725    France _____ Feb. 6, 1956
1,116,726    France _____ Feb. 6, 1956
1,118,500    France _____ Mar. 19, 1956